Patented Feb. 2, 1943

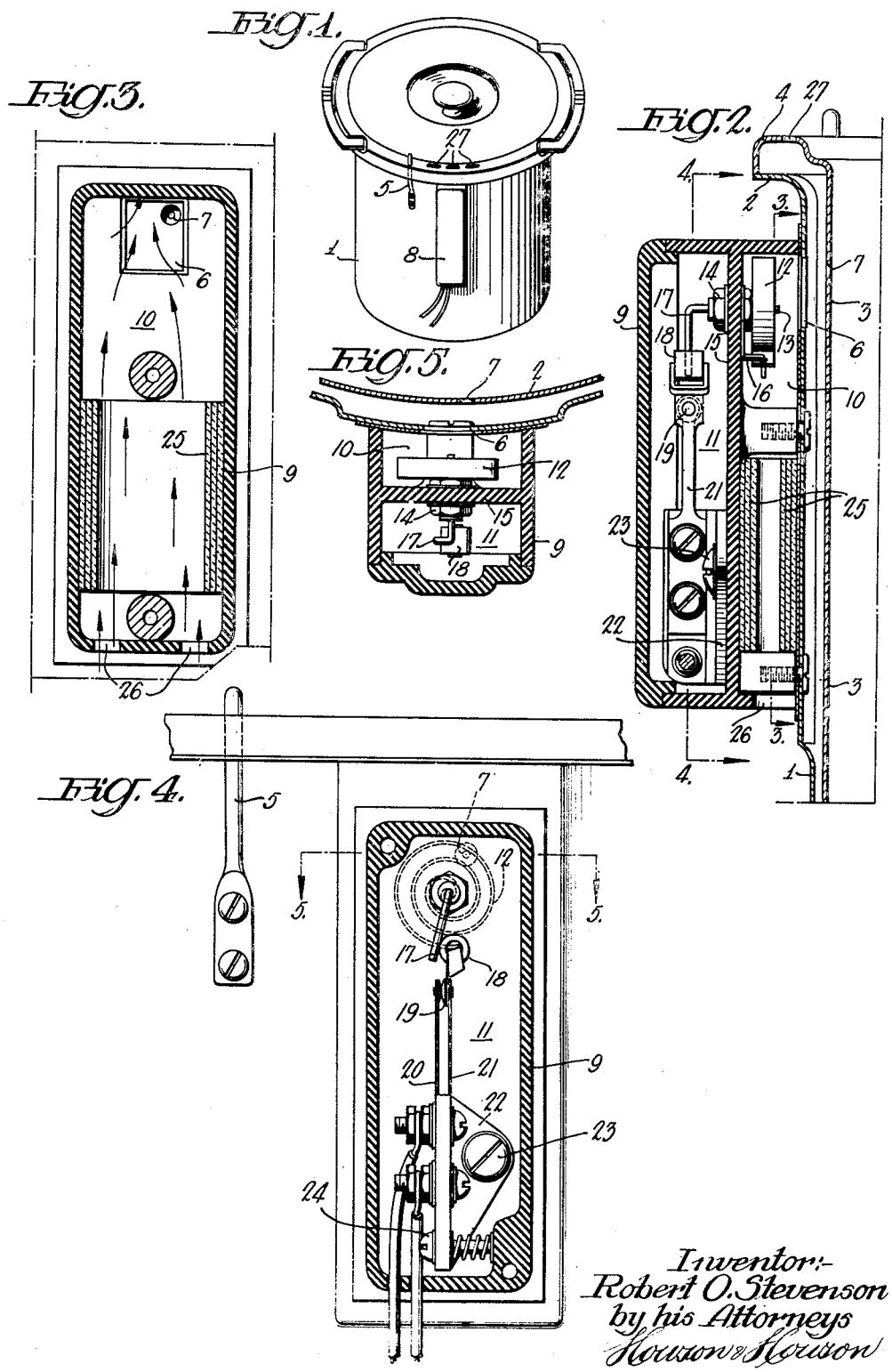

2,310,044

UNITED STATES PATENT OFFICE 2,310,044

THERMOSTATICALLY CONTROLLED COOKING APPARATUS

Robert O. Stevenson, Philadelphia, Pa., assignor to Proctor & Schwartz, Inc., Philadelphia, Pa., a corporation of Pennsylvania Application March 15, 1941, Serial No. 383,636

20 Claims. (Cl. 219—43)

This invention relates to electrical cooking apparatus, and more particularly to well-type cooking devices wherein the cooking operation is accompanied by the generation of steam within a relatively deep well structure forming a cooking chamber. Such devices are frequently employed on modern electric ranges, in which case the top of the well structure is substantially level with the range surface.

It has been proposed heretofore to employ in conjunction with a cooking oven, a thermostat disposed outside the oven in the path of a steam jet issuing from a tube or conduit extending through the oven wall, the thermostat responding to the velocity of the steam and being arranged to operate switching means for controlling the heating unit of the device. Such a thermostat depends for its operation upon the presence of water in the foods being cooked, and in the absence of such water the device may overheat with consequent possible damage and waste of electricity. Moreover, such a device is not able readily to discriminate between the preliminary water vapors which are given off from water-containing foods and the steam which follows. Further still, such a device is not suitable for use in an electric range, since the free discharge of steam below the top surface of the range would cause condensate to come into contact with interior parts of the range and rust them, and furthermore some of the condensate would drop into the storage space for utensils usually provided below the cooking top of a range.

One object of the present invention is to provide an improved thermostatically-controlled cooking device of the well-type which is free of the above-mentioned objections and in which the thermostatic control means responds to an accumulated quantity of steam and the excess steam is exhausted from the top of the device, while the condensate of the used steam is recovered and re-evaporated.

Another object of the invention is to provide a device of this character which is able readily to discriminate between preliminary water vapors and subsequent steam, and which is sensitive to an overheated condition of cooking vessel in the absence of water therein.

Another object of the invention is to provide a steam-responsive thermostatic device which is free of any steam discharge conduit, such as that employed in the aforementioned device, which tends to become clogged by water, particularly when the discharge pressure is so low as to be unable to clear the conduit.

A further object of the invention is to provide a thermostat compartment which is constantly cooled by incoming air through a stack effect, thus permitting the thermostatic switch to reclose quickly in the event the steam discharge terminates.

A still further object of the invention is to provide a thermostatic control device comprising separate compartments, one containing the thermal-responsive means and being adapted to receive emitted steam, and the other compartment containing a switch operated by the thermal-responsive means, thus separating the switch contacts from the deleterious influence of the steam.

The invention may be clearly understood by reference to the accompanying drawing wherein:

Figure 1 is a perspective view of a well-type cooking device constructed according to the invention;

Fig. 2 is a fragmentary sectional view taken through the control mechanism;

Fig. 3 is a sectional view taken along line 3—3 of Fig. 2;

Fig. 4 is a sectional view taken along line 4—4 of Fig. 2; and

Fig. 5 is a sectional view taken along line 5—5 of Fig. 4.

Referring to Fig. 1 of the drawing, there is shown a well-type device which is adapted to be employed as a removable unit on an electric range, and which is provided with an electric heating unit as customary. This device comprises an outer vessel 1 (see Fig. 2) having an upper flange 2, and an inner vessel 3 having a flange 4 adapted to seat on flange 2. A pin 5 on vessel 1 and an accommodating aperture in flange 4 orient the removable inner vessel relative to the outer vessel for the purpose of the invention.

The outer vessel 1 has a relatively large steam outlet opening 6 in the side wall thereof, while the inner vessel 3 has a small chamfered opening 7 disposed as illustrated in Figs. 2 and 3. Steam and water vapor emitted from vessel 3 during ebullition, through opening 7, in a stream of relatively high velocity, are conveyed to the thermostatic device 8 attached to the outer vessel 1 in cooperative relation with said openings.

The control device 8 comprises a casing 9 in thermal conducting relation with vessel 1 and having two compartments 10 and 11, as shown clearly in Figs. 2 and 5. Within compartment 10, there is disposed a thermal-responsive element 12 in the form of a spiral strip (see Fig. 4), the inner end of which is secured to a rod 13 extending through a bearing structure 14 carried by the wall 15. The outer end of strip 12 is secured to a stationary lug 16 carried by wall 15. The rotatable rod 13 extends into compartment 11 and has a bent arm 17 arranged to engage an insulating roller 18 to thus actuate a switch 19 disposed in compartment 11. The switch comprises spring contact fingers 20 and 21 mounted upon an adjustable bracket 22 pivotally secured to the wall 15 by screw 23 and adjustable by means of the adjusting screw 24. The switch is included in the electrical circuit of the device so as to control the same.

The relative size and disposition of openings 6 and 7, and the structure and arrangement of compartment 10 and thermo-responsive element 12, are important and affect the operation of the device. In operation, the stream of steam and water vapor emitted from vessel 3 enters compartment 10 through opening 6, and is dispersed throughout compartment 10 upon striking the upper part of element 12 and the rear wall of compartment 10. After its energy is spent, the steam and water vapor then exit from opening 6 as a low velocity drift. The opening 6 must therefore be made substantially larger than opening 7, as shown, so that it may exhaust the spent steam. The thermal-responsive element 12 will not respond to the presence of heated vapor within the compartment 10 until the volume of the trapped steam is sufficient to maintain the thermostat enclosure at a predetermined temperature usually about the boiling point of water. Therefore, the heating of the cooking chamber is permitted to continue undisturbed until sufficient steam has been generated to build up the volume of trapped steam in compartment 10 sufficiently to activate the element 12. At such time, the element 12 operates the switch 19 through the medium of rod 13. It will be clear, therefore, that heated vapors escaping from the vessel under very low pressure prior to or subsequent to ebullition, will not build up a volume of heated vapor sufficient to actuate the element 12. It is preferred to locate the opening 7 so that the direct stream of vapor does not substantially affect the thermo-responsive element 12, in order to further minimize the effect of heated vapors which are not due to ebullition. As shown, this is done by locating opening 7 so that the stream of vapor impinges upon the uppermost portion of element 12. It is clear that vapors not due to ebullition, being at a lower pressure within vessel 3 than those due to ebullition, are emitted through opening 7 with much less energy than those emitted during ebullition. When the opening 17 is located as described above, the lower pressure vapors escape from opening 6 after merely striking the upper part of element 12. If the opening 7 were located lower in regard to the element 12, such vapors would strike the element 12 at a lower portion, and in escaping, would pass upward, thus affecting also the upper portions of the element 12. It is obvious, therefore, that the undesired affectation of the element 12 by such heated vapors is minimized by locating the opening 7 so that element 12 is only slightly affected by the direct stream of heated vapors. However, steam and water vapor expelled through opening 6 under the increased pressure of ebullition, possess relatively high energy; and when they strike element 12 near the top and the rear wall of compartment 10, they are dispersed throughout the compartment 10. Thus, these higher pressure vapors affect all parts of the thermostatic element 12, and thereby effect actuation thereof.

Within the lower portion of compartment 10 is a hollow absorbent pad 25 which is preferably formed of asbestos, and which functions to recover the condensate from the trapped steam and to re-evaporate the condensate. At the bottom of compartment 10, there are provided air ingress openings 26, and there are also provided openings 27 in flange 4. It will be seen that there is an effective stack or chimney providing a draft by which air is drawn upward through compartment 10, opening 6, the space between vessels 1 and 3, and openings 27. This promotes evaporation of the condensed steam and also cools the compartment 10. Thus this feature of the device provides a quick re-cycle of the thermostatic switch upon cessation of the flow of steam.

The openings 27 also permit the escape of excess steam, which passes from opening 7 upward between the vessel walls and out through openings 27.

In the absence of sufficient steam to actuate the thermostatic switch, the thermostat enclosure is heated by thermal conduction from the wall of vessel 1, thus actuating the thermostatic switch and preventing excessive heating of the device.

Thus it will be seen that the device embodies the various advantages and features set forth at the outset as objects of the invention.

Since the heating unit of the device may take any suitable and known form, it has been deemed unnecessary to illustrate the unit. For example, the heating unit may be disposed at the bottom of the device and it may comprise high and low wattage elements. One satisfactory arrangement is provided by having the high wattage element connected across the high voltage conductors of the usual three-conductor supply line with the thermostatic switch in series with said element, and having the low wattage element connected directly across the low voltage conductors. In such case, both elements will be energized until the thermostatic switch opens, at which time only the low wattage element will be energized.

While a specific form of the invention has been illustrated and described for the purpose of disclosure, it will be understood that the invention is not thus limited, but is capable of various modifications within the scope of the appended claims.

I claim:

1. An electrical cooking apparatus, comprising an electrically heated cooking chamber having a steam outlet opening in the wall thereof, a steam trap external to said chamber and adjacent to said opening, thermostatic means within said trap responsive to the temperature of the trapped steam, means operable by said thermostatic means for controlling the operation of said cooking chamber, and means in said trap for recovering condensate of the trapped steam.

2. An electrical cooking apparatus, comprising an electrically heated cooking chamber having a steam outlet opening in the wall thereof, a steam trap external to said chamber and adjacent to said opening, thermostatic means within said trap responsive to the temperature of the trapped steam, means operable by said thermostatic means for controlling the operation of said cooking chamber, and means in said trap for recovering condensate of the trapped steam and for re-evaporating the condensate to the atmosphere.

3. An electrical cooking apparatus, comprising an electrically heated cooking chamber having a steam outlet opening in the wall thereof, a steam trap external to said chamber and adjacent to said opening, thermostatic means within said trap responsive to the temperature of the trapped steam, means operable by said thermostatic means for controlling the operation of said cooking chamber, and absorbent means in said trap below said thermostatic means for recovering condensate of the trapped steam, said absorbent means being constructed and arranged for the passage of air in contact therewith to re-evaporate the recovered condensate.

4. An electrically operated cooking apparatus, comprising inner and outer vessels adapted to be disposed one within the other, said vessels having alignable wall openings, indexing means on said vessels for aligning said openings, thermostatic means external to said outer vessel and disposed adjacent to said openings, and means operable by said thermostatic means to control the operation of said apparatus.

5. In an electrical cooking apparatus, an electrically heated cooking chamber with provision for emitting steam therefrom below the top of the apparatus, thermostatic means arranged for activation by the emitted steam, means operable by said thermostatic means for controlling the operation of said cooking chamber, means for conveying excess steam from the point of emission to the top of said apparatus, and means for exhausting the excess steam above the top of the apparatus thereby to prevent deleterious effects of the condensate of such steam.

6. In an electrical cooking apparatus, an electrically heated cooking chamber with provision for emitting steam therefrom, a steam compartment external to said chamber and arranged to receive the emitted steam, thermostatic means within said compartment for activation by the emitted steam, means operable by said thermostatic means for controlling the operation of said cooking chamber, means for exhausting excess emitted steam above the top of the apparatus thereby to prevent deleterious effects of the condensate of such steam, and means for recovering condensate in said compartment and for re-evaporating the condensate.

7. In an electrical cooking apparatus, an electrically heated cooking chamber having spaced walls with steam emission openings and having at least one opening at the top communicating with the space between said walls, a steam compartment external to said chamber and arranged to receive the emitted steam, thermostatic means within said compartment for activation by the emitted steam, means operable by said thermostatic means for controlling the operation of said cooking chamber, the space between said walls serving to convey excess emitted steam to said top opening where it is exhausted above the top of the apparatus thereby to prevent deleterious effects of the condensate of such steam, and means for recovering condensate in said compartment and for re-evaporating the condensate.

8. In an electric cooking apparatus, an electrically heated cooking chamber with provision for emitting steam therefrom, and a thermostatic control device for controlling the operation of said cooking chamber, said device comprising a casing arranged in thermal conducting relation with a wall of said chamber and adapted to receive the emitted steam, and thermostatic control means within said casing responsive to heat conveyed thereto either by the emitted steam or by conduction through said chamber wall and said casing.

9. In an electrical cooking apparatus, an electrically heated cooking chamber having a small steam emission opening of negligible axial dimension so as to be free of any tendency to become clogged with condensate, a steam receptacle external to said chamber and having a relatively large steam admission opening adjacent to said first-named opening and aligned therewith to receive the emitted steam, thermostatic means within said receptacle for activation by the emitted steam, and means operable by said thermostatic means for controlling the operation of said cooking chamber.

10. In an electrical cooking apparatus, an electrically heated cooking chamber having a relatively thin wall and a chamfered opening therein to emit steam with substantially complete freedom of any tendency to become clogged with condensate, a steam receptacle external to said chamber and arranged in proximity to said opening to receive the emitted steam, thermostatic means within said receptacle for activation by the emitted steam, and means operable by said thermostatic means for controlling the operation of said cooking chamber.

11. In an electrical cooking apparatus, an electrically heated cooking chamber having provision for emitting steam, a steam receptacle external to said chamber and constructed to provide a continuously unobstructed chimney or stack for drawing air into said receptacle to cool the same, and thermostatic control means in said receptacle for controlling the operation of said cooking chamber whereby said thermostatic control means is quickly cooled upon cessation of the emitted steam.

12. In an electrical cooking apparatus, an electrically heated cooking vessel having provision for emitting steam, thermostatic control means in the path of the emitted steam and adapted to control the operation of the cooking vessel, and means forming a chimney externally of said vessel in cooperative relation with said thermostatic means for quickly cooling the latter upon cessation of the emitted steam.

13. In an electrical cooking apparatus, a double walled cooking chamber having closely spaced walls with openings for emission of steam, the inter-wall space communicating with the atmosphere at the top of said chamber, a steam receptacle external to said chamber and arranged to receive the emitted steam, said receptacle having an opening at its bottom for ingress of air and forming with said inter-wall space an effective chimney to produce an air draft upward through said receptacle, thermostatic means within said receptacle for activation by the steam, and means operable by said thermostatic means to control the operation of said cooking chamber.

14. In a cooking apparatus, a chamber having an associated heating means, said chamber having an opening for emitting a stream of steam therefrom, a compartment exterior to said chamber, thermo-responsive means in said compartment for controlling said heating means, said compartment having an opening for admitting said stream of steam into said compartment, and means for dispersing said stream of steam throughout said compartment, so as to affect said thermo-responsive element, the opening in said compartment being sufficiently large to permit the escape of spent steam from said compartment simultaneously with the entrance of said stream of steam.

15. In an automatic cooking apparatus, a cooking chamber having an associated heating means, a compartment exterior to said chamber, thermo-responsive means in said compartment for controlling said heating means, means for permitting heated vapors to escape from said cooking chamber, and common means for simultaneously admitting the heated vapor from said cooking chamber to said compartment and for expelling the previously admitted vapors from said compartment.

16. In a cooking apparatus, a cooking chamber having an associated heating means, means in said chamber for permitting the escape of heated vapors therefrom, a compartment external to said chamber having an opening for admitting heated vapors into and exhausting them from said compartment, and thermo-responsive means located within said compartment for controlling said heating means, constructed and arranged so as to be actuated substantially entirely by vapors emitted from said chamber at relatively high pressure due to ebullition.

17. In a cooking apparatus, a cooking chamber having an associated heating means, means in said chamber for permitting the escape of a stream of heated vapors therefrom, a compartment external to said chamber, means for admitting said stream of heated vapors into said compartment, and thermo-responsive means located within said compartment for controlling said heating means, constructed and arranged so as to minimize the affectation thereof by said direct stream of heated vapors, whereby said thermo-responsive means is responsive substantially entirely to an accumulation of heated vapors in said compartment.

18. In a cooking apparatus, a cooking chamber having an associated heating means, said chamber having an opening to permit the escape of a stream of heated vapors therefrom, a compartment external to said chamber having an opening to permit the entrance of said stream of heated vapors, thermo-responsive means within said compartment for controlling said heating means, said thermo-responsive means being so located as to minimize the affectation thereof by the direct stream of said heated vapors, and means for dispersing said stream of heated vapors throughout said compartment so as to cause affectation of said thermo-responsive means by the dispersed vapors.

19. In a cooking apparatus, a cooking chamber having an associated heating means, said chamber having a small opening for emitting a stream of heated vapors therefrom, a compartment external to said chamber having a relatively large opening arranged to admit said vapors into and exhaust them from said compartment, and thermo-responsive means located within said compartment for controlling said heating means, said thermo-responsive means being arranged so that the top portion thereof is in the path of the direct stream of heated vapors, whereby said thermo-responsive means is responsive substantially entirely to vapors emitted from said chamber at relatively high pressure due to ebullition and dispersed within said compartment.

20. In a cooking apparatus, a cooking chamber having an associated heating means, means in said chamber for permitting the escape of a stream of heated vapors therefrom, a compartment external to said chamber having an opening for admitting heated vapors into and exhausting them from said compartment, and thermo-responsive means located within said compartment for controlling said heating means, constructed and arranged so as to minimize the affectation thereof by said direct stream of heated vapors, and means for establishing a draft of air through said compartment and out said opening.

ROBERT O. STEVENSON.